No. 615,846. Patented Dec. 13, 1898.
J. F. HAND.
APPARATUS FOR PURIFYING WATER.
(Application filed July 13, 1894.)
(No Model.)
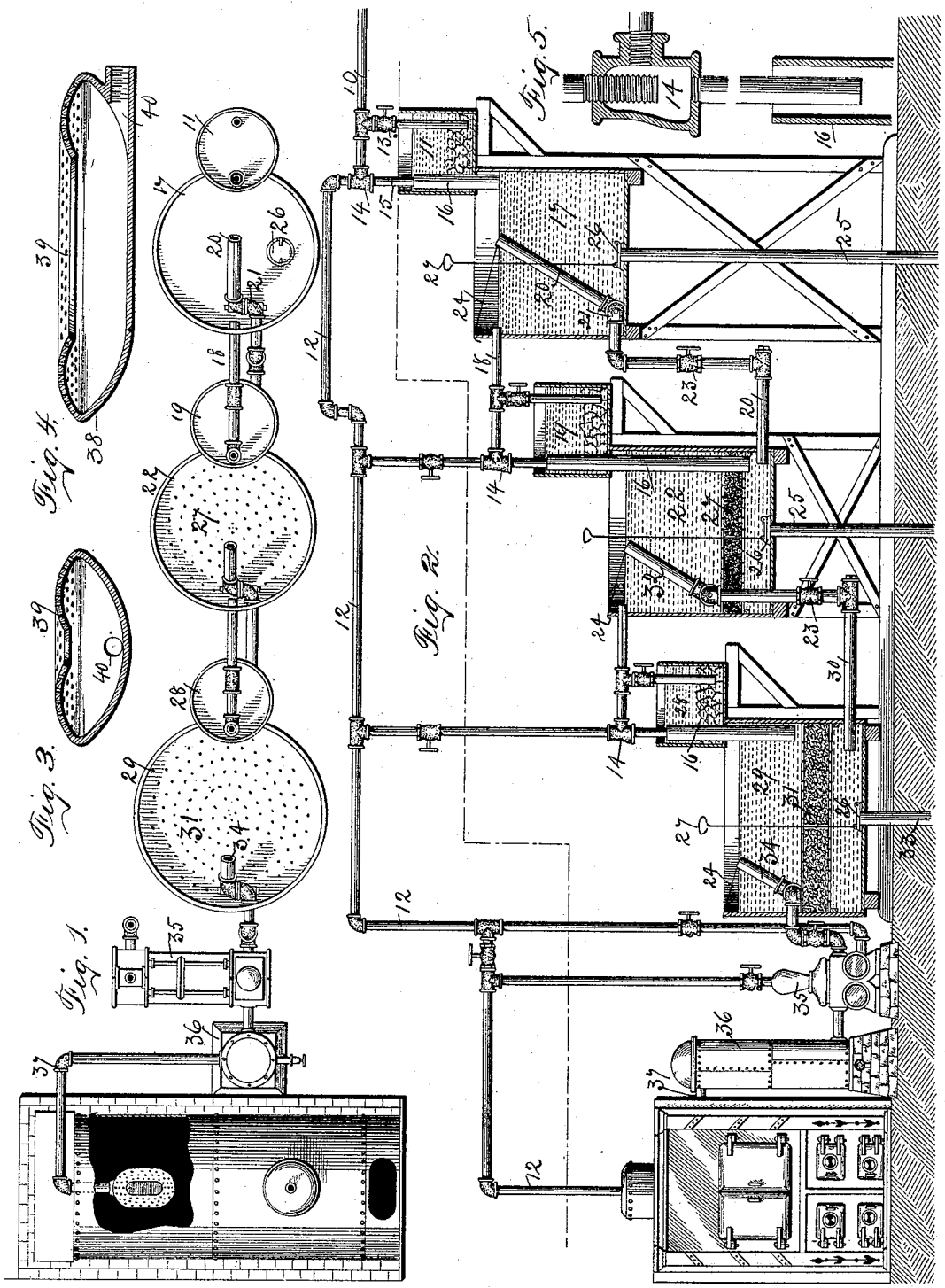

UNITED STATES PATENT OFFICE.

JUAN F. HAND, OF DES MOINES, IOWA, ASSIGNOR OF ONE-HALF TO JAMES M. HARRIS, OF SAME PLACE.

APPARATUS FOR PURIFYING WATER.

SPECIFICATION forming part of Letters Patent No. 615,846, dated December 13, 1898.

Application filed July 13, 1894. Serial No. 517,402. (No model.)

*To all whom it may concern:*

Be it known that I, JUAN F. HAND, a citizen of the United States of America, residing at Des Moines, in the county of Polk and State of Iowa, have invented a new and useful Apparatus for Purifying Water, of which the following is a specification.

The object of this invention is to produce an apparatus through which water may be passed to eliminate or render harmless to the boiler-tubes, &c., all inorganic matter, sulfates, or solids carried in solution of such a nature as to produce scales or deposits on boiler-tubes, heating apparatus, &c.

To this end my invention consists, first, in the method of treating the water so as to act first on the ingredients that may be precipitated and deposited and then on those that may be precipitated but not deposited and that may be removed by filtration and finally rendering harmless to the boiler-tubes, &c., the remaining deleterious ingredients; and my invention consists, further, in the construction, arrangement, and combination of the apparatus for practicing my method, as hereinafter set forth, pointed out in my claims, and illustrated in the accompanying drawings, in which—

Figure 1 is a top or plan view of the apparatus applied to a steam-boiler. Fig. 2 is a side elevation of the same. Figs. 3 and 4 are respectively transverse and longitudinal sectional views of the device to be placed in a boiler to retain any organic substances that may be precipitated by a high degree of heat in the boiler. Fig. 5 is an enlarged detail view of the device for commingling the chemicals, water, and steam.

The apparatus for practicing this method consists of a series of tanks connected by pipes and provided with suitable outlets, filters, &c., through which the water is passed in a continuous stream, beginning with the supply-pipe 10. The water flows from thence into a chemical-tank 11, and a branch of said pipe leads to a steam-pipe 12. A valve 13 in the supply-pipe controls the quantity and direction of the water-flow to the tank 11. A branch of said pipe leads to a point near the bottom of said chemical-tank, which is supplied with certain chemicals in a solid form, an example of which is hereinafter given, of such a nature as to precipitate all elements in the particular kind of water used capable of being so treated. A device (shown in detail in Fig. 5) is provided for supplying heat to the precipitating-tank, as follows: The steam-supply pipe 12, that leads from a boiler or exhaust-pipe of a pump or engine, enters an elbow-joint 14, which is also adapted to receive the branch pipe-section of the supply-pipe, it being large enough to allow the water and steam to commingle therein.

15 is a short pipe-section leading downwardly from the part 14.

16 indicates a pipe-section of much larger diameter than the pipe 15 and leading from a point near the top of the chemical-tank 11 through the bottom of the same. The water in tank 11, after it has become saturated with the chemicals, overflows into the pipe 16, where it is commingled with the water and steam passing through pipe 15. The water thus treated passes from thence to the tank 17, where the elements in the water capable of being so acted upon are precipitated. The supernatent water from this precipitating-tank 17 is drawn off through two eduction-pipes, the first, 18, leading into a chemical-tank 19, provided with a heating device 14 and connected with the steam-supply pipe 12 in the same manner as the hereinbefore-described chemical-tank, and the remainder through a pipe 20, that is provided with a loose elbow-joint 21 in the bottom of the tank and leading from thence to a filtering-tank 22, hereinafter described, a cut-off 23 being provided in said pipe, by which the flow therethrough may be regulated or stopped.

24 indicates a wire attached to the top of the pipe 20 and to the side of the tank, by which the height of the said pipe relative to the pipe 18 may be adjusted so that the water may be drawn through either pipe or both at the same time. By thus drawing the water from the top of the tank the precipitated residuum is left on the bottom and may be drawn off through a pipe 25 in its bottom, provided with a valve 26, controlled by a rod 27, leading to the top of the tank.

The chemical-tank 19 is filled with certain chemicals, hereinafter described, of a nature that when mixed with the water will render precipitate all inorganic substances carried in solution therein of approximately the same or a lighter specific gravity than the water incapable of being readily precipitated by the first precipitating treatment, and the water from the chemical-tank 19 is carried to the bottom of the filtering-tank 22 by means of the pipe 16 from the heating apparatus, while the water from the pipe 20 is also passed to the bottom of the tank, only so much of the water being passed through the chemical-tank as may become a saturated solution.

27 indicates a filter placed near the bottom of the filtering-tank and through which all of the water must pass, leaving the precipitated substances below the filter.

The same means as provided for the precipitating-tank being provided for cleaning out the bottom of the filtering-tank and for drawing off the water into a chemical-tank 28 and to tank 29, in which the chemicals added to the water by the previous steps may be rendered harmless to boiler-tubes, &c., heat is applied to this chemical-tank 28 in the same manner as to the other chemical-tanks, the pipe of egress therefrom passing to the top of the tank 29, and the pipe 30, leading from the filtering-tank, enters the lower portions of the tank 29. A filter 31 is placed in this tank 29, and the water is drawn off from the top of the tank by an adjustable pipe 34 of a similar construction to the pipes communicating between the precipitating and filtering tanks. After the water has passed through the said precipitating and filtering tanks certain of the chemicals contained in the chemical-tanks and added to the water still remain therein, and the chemical-tank 28 is filled with chemicals of a granular nature, hereinafter described, that will render harmless the effect of said chemicals and prevent said chemicals from deteriorating the boiler-tubes or forming a deposit thereon. A cleaning-out pipe 33 is provided at the bottom of the tank, and an adjustable pipe of egress 34, similar to the pipes for a like purpose in the other tanks, leads from this tank to a pump 35, from which it is forced into the usual containing-tank 36. A pipe 37 leads therefrom to the interior of the boiler and enters an oblong chamber 38, having a perforated top 39 and an opening 40 at its end adapted to admit the pipe 37. This device is for the purpose of retaining any particles that may be precipitated by a high degree of heat in the boiler and not eradicated by the previous steps.

I do not desire to be understood as limiting myself to or to the number and arrangement of the tanks. In many instances two or more filtering-tanks have been found necessary when the water is used containing elements that cannot be precipitated by the same chemicals.

In the practical use of my invention I apply chemicals and heat to a body of water to precipitate certain of the foreign elements, then drawing off the supernatent water, then applying chemicals and heat to render precipitate the remaining deleterious or scale-producing elements, then filtering the water, then applying chemicals and heat to render harmless to the boiler-tubes, &c., the chemicals added to the water by the above steps or other elements that may be so treated, and, finally, in passing the water through an oblong bowl-shaped receptacle.

As an example illustrative of the practical use of my apparatus we will assume that the water to be treated contains in solution and suspended therein the following solids on a basis of one hundred thousand parts: silica and insoluble residue, 14.795; sodium chlorid, 17.720; sodium sulfate, 166.350; potassium chlorid, trace; magnesium phosphate, .570; magnesium sulfate, 42.370; calcium sulfate, 52.110; calcium carbonate, 16.340; alumina, .755; iron carbonate, trace. It is not necessary to discover the exact proportionate quantity of each ingredient. In the first chemical-tank 11 I use: caustic soda, sixty-five parts; soda-ash, twenty parts; alum, fifteen parts. These chemicals are mixed together to form a lumpy or granular compound, through which part of the water percolates and is admitted to the precipitating-tank 17. Only so much water is passed through the chemical-tank 11 as will become a saturated solution and be necessary to form a granular precipitate of all the lime, magnesia, and iron in the water. This action may be easily seen, and enough water is admitted through the chemical-tank, when the said elements quickly precipitate when heated to approximately 130° Fahrenheit. In the second chemical-tank 19 the following chemicals, mixed to form a lumpy substance, are placed: sulfate of ammonia, ten parts; carbonate of soda, fifty-five parts; borax, (crude,) twenty-five parts; oxalic acid, ten parts. Into this tank is admitted a slight stream of water from the precipitating-tank 17, and said water after filtering through the said chemicals and becoming a saturated solution is passed to the filtering-tank 22 and mingled with the remainder of the water from the precipitating-tank 17, whereupon the carbonates and sulfates yet remaining in the water are formed into a precipitate of about the same specific gravity as the water. This water is then passed upwardly through the filter 27 and the precipitate retained below the filter. A portion of the water from this filtering-tank 22 is drawn off to a third chemical-tank 28. In this tank is placed a lumpy mixture of the following chemicals: terra japonica or pale catechu, sixty-six parts; extract of hemlock, thirty parts; tannic acid, two parts; acetic acid, two parts. A small stream from this tank enters the tank 29 and when mixed with the remainder of the water deposited therein from the filtering-tank will render all chemicals in the water, whether added by the chemicals used or not, non-injurious to the boiler-tubes, &c. The water is then in condition to be admitted to the boiler.

I am aware that heretofore heat and chemicals have been added and applied to a flowing stream of water for the purpose of precipitating organic matter in water intended to be used for drinking purposes, and I therefore do not claim the application of heat and chemicals in this manner for water to be used in any way; but I am not aware of any instance in which water has been so treated and the deposited residuum removed and then chemicals added to neutralize or render inert corrosive properties that may have been contained in the water or added thereto in the precipitant to provide a water that may be used in boilers or for other mechanical purposes without corroding or destroying metal. It being understood that most of the effective chemical precipitants which it is commercially practical to use contain corrosive properties and that when a neutralizing element is introduced into the precipitant the effect is to decrease the efficiency of the precipitant, I have discovered that by first adding a precipitant, no matter how great its inherent incrustive properties may be, and then after removing the deposit adding a neutralizer, substantially as described, a commercially practical and economical method of purifying water is attained.

Having thus described my invention, what I claim as new, and desire to secure by Letters Patent of the United States therefor, is—

1. In an apparatus for removing deleterious and scale-producing substances from water, the following elements in combination to wit: a suitable supply-pipe, a chemical-tank with said pipe leading to the interior bottom portion, an overflow-pipe leading from a point near the top of said chemical-tank downwardly and a smaller pipe leading from a suitable source of steam-supply into said pipe, a settling-tank arranged to receive water from the chemical-tank and a pipe arranged to carry off the water from said tank and means for drawing off the surface water from the chemical-tank, substantially as set forth.

2. An apparatus for removing deleterious and scale-producing substances from water, comprising a chemical-tank, means for drawing off the water therefrom, means for heating said water by steam, a settling-tank arranged to receive said water, a second chemical-tank, means for heating same by steam, means for drawing off the surface water from the settling-tank into the second chemical-tank, a filtering-tank, means for admitting the remainder of the water from the settling-tank and from the second chemical-tank to said filtering-tank, a third chemical-tank, means for heating the same by steam, a third water-containing tank and means for admitting the water from the third chemical-tank and the filtering-tank into the said third water-containing tank, for the purposes stated.

3. An apparatus for removing deleterious and scale-producing substances from water, comprising a chemical-tank, means for drawing off the water therefrom, means for heating said water by steam, a settling-tank arranged to receive said water, a second chemical-tank, means for heating same by steam, means for drawing off the surface water from the settling-tank into the said chemical-tank, a filtering-tank, means for admitting the remainder of the water from the settling-tank and from the said chemical-tank to said filtering-tank, a third chemical-tank, means for heating the same by steam, a third water-tank, means for admitting the water from the third chemical-tank and the filtering-tank into the third water-containing tank, and means for drawing off the residuum from the settling, filtering and third water-containing tanks.

4. An apparatus for removing deleterious and scale-producing substances from water, comprising a chemical-tank, means for drawing off the water therefrom, means for heating said water by steam, a settling-tank arranged to receive said water, a second chemical-tank, means for heating the same by steam, means for drawing off the surface water from the settling-tank into the second chemical-tank, a filtering-tank, means for admitting the remainder of the water from the settling-tank and from the second chemical-tank to said filtering-tank, a third chemical-tank, means for heating the same by steam, a third water-containing tank, means for admitting the water from the third chemical-tank and the filtering-tank into the third water-tank and the means for drawing off the residuum from the settling, filtering and third water-containing tanks, and a device having a perforated top adapted to be placed in a boiler, and to receive the water from the third water-containing tank, for the purposes stated.

JUAN F. HAND.

Witnesses:
J. M. HARRIS,
THOMAS G. ORWIG.